United States Patent
Sheu

(10) Patent No.: US 9,264,621 B2
(45) Date of Patent: Feb. 16, 2016

(54) ELECTRONIC VIEWFINDER

(71) Applicant: ABILITY ENTERPRISES CO., LTD., Taipei (TW)

(72) Inventor: Jer-Yuan Sheu, Taipei (TW)

(73) Assignee: ABILITY ENTERPRISES CO., LTD., Taipei (TW)

( * ) Notice: Subject to any disclaimer, the term of this patent is extended or adjusted under 35 U.S.C. 154(b) by 196 days.

(21) Appl. No.: 13/758,227

(22) Filed: Feb. 4, 2013

(65) Prior Publication Data

US 2013/0201378 A1 Aug. 8, 2013

(30) Foreign Application Priority Data

Feb. 7, 2012 (TW) .............................. 101103975 A

(51) Int. Cl.
H04N 5/232 (2006.01)

(52) U.S. Cl.
CPC ................................. *H04N 5/23293* (2013.01)

(58) Field of Classification Search
CPC ............ H04N 5/23293; H04N 5/2251; H04N 5/2254; G02F 2001/133618; G03B 13/06
USPC ..................................................... 348/333.08
See application file for complete search history.

(56) References Cited

U.S. PATENT DOCUMENTS

| | | | | |
|---|---|---|---|---|
| 5,052,791 A | * | 10/1991 | Kikuchi | 359/421 |
| 5,900,988 A | * | 5/1999 | Ohshita | 359/676 |
| 5,956,178 A | * | 9/1999 | Furuta | 359/432 |
| 6,052,225 A | * | 4/2000 | Hoshi | 359/432 |
| 7,630,627 B2 | * | 12/2009 | Matsuda | 396/384 |
| 2002/0001136 A1 | | 1/2002 | Takahashi et al. | |
| 2004/0013423 A1 | * | 1/2004 | Wells et al. | 396/296 |
| 2005/0286135 A1 | | 12/2005 | Weissman et al. | |
| 2011/0242397 A1 | * | 10/2011 | Miyazawa et al. | 348/333.09 |
| 2012/0127595 A1 | * | 5/2012 | Matsuo | 359/716 |

FOREIGN PATENT DOCUMENTS

| | | |
|---|---|---|
| CN | 1329269 A | 1/2002 |
| CN | 101806956 A | 8/2010 |
| JP | H09146019 A | 6/1997 |

(Continued)

OTHER PUBLICATIONS

Office Action issued to a Taiwan counterpart patent application 101103975 on Nov. 13, 2013.

(Continued)

*Primary Examiner* — Twyler Haskins
*Assistant Examiner* — Fayez Bhuiyan
(74) *Attorney, Agent, or Firm* — WPAT, P.C.; Anthony King

(57) ABSTRACT

An electronic viewfinder is configured to magnify an image and provide adjustable diopter for different observers. The electronic viewfinder includes an aperture stop, a lens group totally with positive power, and a display. The components in the electronic viewfinder are arranged sequentially between the observer and the image. The lens group is utilized to enlarge the image, and the lens group includes a first lens with positive power and a second lens with negative power. The display is for showing the image. A first planar lens is disposed between the aperture stop and the lens group. A second planar lens may be disposed between the lens group and the display. A polarizer may be arranged between the second planar lens and the lens group.

19 Claims, 8 Drawing Sheets

(56) References Cited

FOREIGN PATENT DOCUMENTS

| | | |
|---|---|---|
| JP | 2001324741 | 11/2001 |
| TW | 200736789 | 10/2007 |

OTHER PUBLICATIONS

English translation of Office Action issued to a Taiwan counterpart patent application 101103975 on Nov. 13, 2013.
English abstract translation of TW200736789.
Office Action dated Mar. 26, 2015 issued by China Intellectual Property Office to counterpart China application 201210030070.2.
English abstract translation of the Office Action dated Mar. 26, 2015 issued by China Intellectual Property Office to counterpart China application 201210030070.2.
English abstract translation of JPH09146019A.
English abstract translation of CN101806956A.
English abstract translation of CN1329269A.
Office action dated Oct. 26, 2015 from counterpart China application 201210030070.2.
English abstract translation of the Office action dated Oct. 26, 2015 from counterpart China application 2012100300702.
English abstract translation of JP2001324741.

\* cited by examiner

ELECTRONIC VIEWFINDER

BACKGROUND

1. Technical Field

The present invention relates to an electronic viewfinder and, in particular, a thin, low-cost, high-magnification, high-resolution, and diopter adjustable viewfinder with increased comfort for the observer.

2. Description of Related Arts

Image capture devices can be used for digital camcorders or cameras that retrieve images of objects by zoom lenses and image sensors. For some image capture devices, the observer can further view objects through an electronic viewfinder.

Electronic viewfinders become increasingly slimmer and lighter in recent times. However, magnification or resolution of the images shown in the electronic viewfinder and the ease of use can not be optimized for different observers.

SUMMARY

One of the embodiments of the present invention is to propose an electronic viewfinder which can achieve high-magnification, high-resolution, a high level of comfort and that is cost-effective.

Each observer has his/her own least distance of distinct vision (LDDV). In general, the LDDV (or called L) of human eyes ranges between ±250 mm to ±1000 mm. The diopter, D, is defined as 1000/L. For an observer having a LDDV of −333 mm, the diopter of his/her eyes is −3D. For an observer having a LDDV of −500 mm, the diopter of his/her eyes is −2D. Corrective lenses are needed for a person with diopter deviation.

The present invention is related to an electronic viewfinder. The electronic viewfinder provides an adjustable apparatus in a limited space so that images on a display in the electronic viewfinder can be magnified by the apparatus and clearly transmitted to observers. The adjustable apparatus of the electronic viewfinder may also provide the best eye relief for different observers.

In some particular embodiments, the adjustable apparatus contains a lens group characterized with an adjustable diopter and the lens group is placed on one side of a first planar lens, wherein the observer is on the other side of the first planar lens. The lens group is able to enlarge images shown in the electronic viewfinder for observation. The diopter of the lens group also can be adjusted for different observers. The lens group can be relocated relative to the first planar lens.

In some particular embodiments, the lens group includes two lenses, a first lens with positive power and a second lens with negative power. The first lens can be optionally arranged closer to the first planar lens than the second lens.

The lens group can be relocated relatively to the first planar lens along the normal direction of the first planar lens. By changing the distance between the lens group and the observer, the diopter of the electronic viewfinder can be adjusted to meet the required LDDV of the observer. In one embodiment, images shown on the display can be enlarged to a desired magnification by changing the distance between the lens group and the observer.

In one embodiment, an electronic viewfinder is configured to magnify an image. The electronic viewfinder includes an aperture stop, a lens group totally with positive power, and a display. The components in the electronic viewfinder are arranged sequentially between the observer and the image. The lens group is utilized to enlarge the image, and the lens group includes a first lens with positive power and a second lens with negative power. The display is for showing the image. A first planar lens is disposed between the aperture stop and the lens group. The distance measured from the aperture stop to the surface of the first planar lens toward observers is greater than or equal to 15 mm.

Another embodiment provides an electronic viewfinder to observe images, where the components in the electronic viewfinder are arranged sequentially between observers and images. The components of the electronic viewfinder sequentially comprises: an aperture stop for the observation of the image; a lens group totally with positive power to magnify the images; and a display for showing the image. The lens group arranges sequentially between the observer and the image comprises a first lens with positive power and a second lens with negative power. As the lens group moves, the diopter of the electronic viewfinder is changed. The electronic viewfinder is characterized with TTL/EFL≤1.5, wherein TTL is a distance from a surface of the first lens proximal to the observing side to the display when the electronic viewfinder performs 0 diopter (0D), and the EFL is the focal length of the lens group.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is related to an electronic viewfinder located in a limited predetermined space. The diopter in the present invention is adjustable for different observers, for each observer may have his/her own least distance of distinct vision (LDDV). Observers can clearly see images shown on the display of the electronic viewfinder. In one of the embodiments, the electronic viewfinder includes: a first planar lens placed on one side close to observers; and a lens group characterized with an adjustable diopter and the lens group is placed on the opposite side of the first planar lens and the observers. The lens group can be relocated relatively to the first planar lens, and images in the electronic viewfinder can be magnified on the display 1 and clearly transmitted to the observers.

Figure 1A:
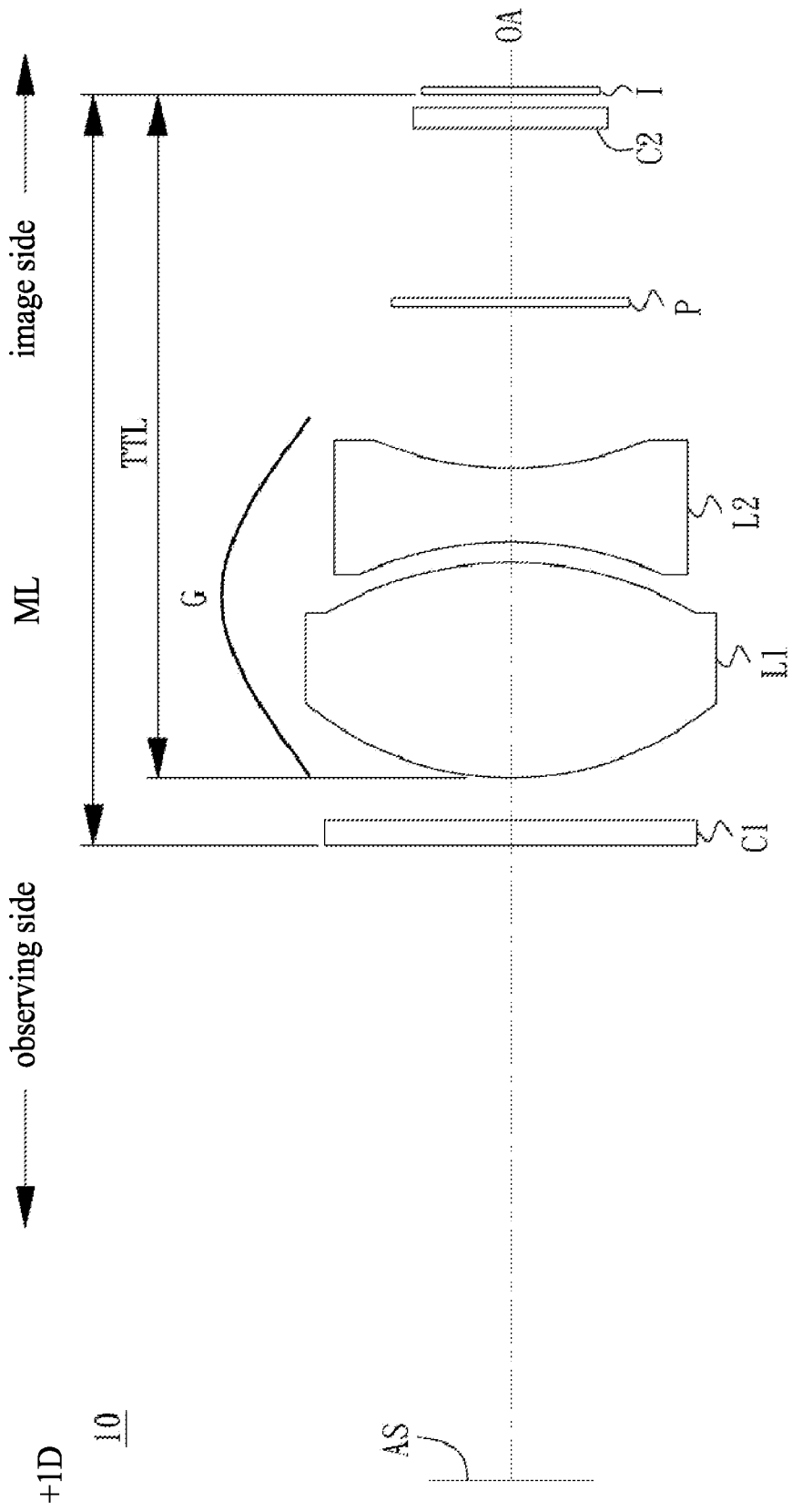
FIGS. 1A and 1B show the electronic viewfinder according to one of the embodiments.
Figure 1B:
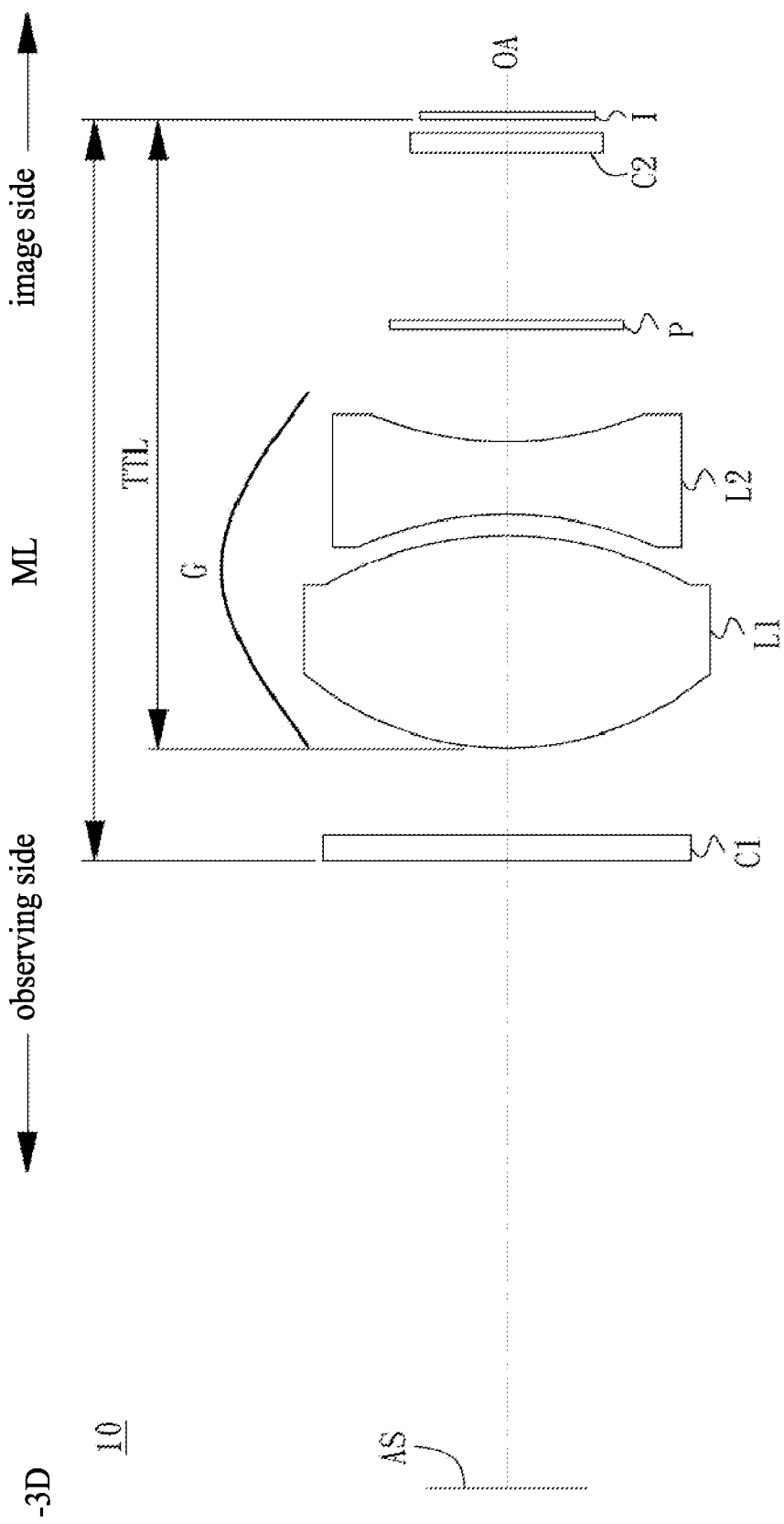

FIGS. 1A and 1B respectively show an embodiment of an electronic viewfinder 10 according to the present invention, wherein FIG. 1A shows the position of the respective elements of the electronic viewfinder 10 at diopter, +1D. FIG. 1B shows the position of the respective elements of the electronic viewfinder 10 at diopter, −3D. The electronic viewfinder 10 can be applied to any electronic device, preferably for image capture devices such as a digital camcorder or camera, but it is not limited thereto. The electronic viewfinder 10 having a first planar lens C1 and a display I positioned between an observing side and an image side, and the electronic viewfinder 10 includes a lens group G with positive power from the observing side to the image side comprising at least a first lens L1 with positive power and a second lens L2 with negative power.

As shown in the figures, the electronic viewfinder 10 with its main components arranged between observers and images. In the drawings also illustrating the aperture stop AS, located on the observing side. The aperture stop AS may be a physical located in the electronic viewfinder 10 or a virtual point outside the electronic viewfinder 10. The aperture stop AS may be configured to confine light entering into an observer's eye. In the present disclosure, the aperture stop AS can be configured as design reference points, and this design reference point can be an observer's pupil, but it is not limited thereto. In some embodiments, the diameter of the aperture stop AS is 4 mm, and in some embodiments the diameter of the aperture stop AS is not less than or equal to 4.5 mm.

In one embodiment, the lens group G and the display I are included. The display I is utilized for showing images and the lens group G is utilized to enlarge images. Observers can see an enlarged image through the aperture stop AS. A transmissive liquid crystal display (LCD) or a reflection-type liquid crystal display (Reflective LCD) is preferably utilized for the display I.

In addition, the first planar lens C1 may be arranged between the aperture stop AS and the lens group G, and a second planar lens C2 may be disposed between the lens group G and display I. Moreover, a polarizer P may be arranged between the second planar lens C2 and the lens group G. The first planar lens C1 is for protecting elements in the electronic viewfinder 10, such as dust entering from outside. The second planar lens C2 is for protecting the display I. The polarizer P is for changing polarization states of light emitted from display I. In this embodiment, shapes of the polarizer P are flat; however, the shape may differ according to the light source structure of display I.

The electronic viewfinder 10 includes a module length ML, which is defined as a distance from a surface of the first planar lens C1 proximal to the observing side to the display I. In some embodiments, the module length ML may be less than 25 mm. In some particular embodiments, the module length ML is less than 21 mm.

The definition of eye relief is the distance measured from the aperture stop AS (in this embodiment, the aperture stop may be the observer's pupil) to the surface of the first planar lens C1 toward the observing side. In order to provide more eye comfort for the observers, eye relief of the electronic viewfinder 10 is preferably be greater than or equal to 15 mm in this embodiment. In some embodiments, due to having smaller space and a diopter adjustable lens group G, greater eye relief can be achieved with a smaller module length ML. For example, in one embodiment, the ratio of module length ML and eye relief is less than 1.7.

To achieve miniaturization purposes, the electronic viewfinder 10 in one embodiment has a lens group G including a first lens L1 with positive power and a second lens L2 with negative power. It is preferable that the first lens L1 is arranged between the first planar lens C1 and the second lens L2. The first planar lens L1 is relatively closer to the observing side than the second lens L2. The second lens L2 is arranged between the first lens L1 and the polarizer P. The second lens is relatively closer to the image side. The lens group G with adjustable diopter positioned opposite to the first planar lens C1 and the observing side, wherein the lens group is allowed to generate relative displacement with respect to the first planar lens L1, and the lens group G is allowed to enlarge an image on the display.

Lens group G along the optical axis OA, can be relocated relatively to the first planar lens C1 so as to change the diopter. The adjustment range of diopter varies by adjusting the module length ML of the electronic viewfinder 10. For example, if the module length ML is 21 mm, the diopter can be adjusted between −5D to +5D so that the adjustable range of diopter is defined herein as 10D(|+5D-(−5D)|). In one embodiment, the diopter can be adjusted between +1D to −3D so that the adjustable range of diopter is defined herein as 4D(|+1D-(−3D)|). As the lens group G is relocated, the distance from the first lens L1 to the second lens L2 is unchanged so that the focal length of the lens group G remains constant. When the lens group G is gradually moved toward the image side, the diopter gradually decreases, for example, the diopter goes from +1D to −3D. The other components remain static, while the lens group G is moving. In some embodiments, the ratio of the module length ML and the adjustable range of diopter is less than 6.25 mm/D. In some embodiments, the ratio of the module length ML and the adjustable range of diopter is less than 2.1 mm/D. In brief, the present invention has a larger adjustable dioptric range in a limited space.

Another characteristic of the present invention is that images can be enlarged to a desired magnification on display I by the electronic viewfinder 10. If the magnification of the electronic viewfinder 10 is defined as 250/EFL, wherein the EFL is the focal length of the lens group G. In one embodiment, the magnification of the electronic viewfinder 10 is 15 times greater or more, i.e. 250/EFL≥15.

A total track length, TTL, is defined as a distance from a surface of the first lens proximal to the observing side to the display when the electronic viewfinder performs 0 diopter (0D). To achieve the miniaturization purpose for the electronic viewfinder 10, in one embodiment, the ratio of the TTL and the focal length EFL of the lens group G is less than 1.5, i.e. TTL/EFL≤1.5.

In order to make images clear, the electronic viewfinder 10 should meet the requirement, nd1<1.56 and vd1>50, wherein nd1 is the refractive index of the first lens L1; and vd1 is the Abbe number of the first lens L1.

In order to make images clear, the electronic viewfinder 10 should meet the requirement, nd2>1.56 and vd2<50, wherein nd2 is the refractive index of the second lens L2; and vd2 is the Abbe number of the second lens L2.

In addition, the lens group G includes at least one aspherical lens or a free formed lens, and material of the lens can be plastic or glass. The plastic material includes, but is not limited to, polycarbonate, cyclic olefin copolymer such as APEL, or polyester resin such as OKP4 or OKP4HT. Specifically, a glass lens is made of an optical-grade glass material by grinding, polishing, or glass molding process (GMP). The plastic lens can be made of a polymer-based molding injection. Furthermore, each free formed lens includes at least a free-form surface, while each aspherical lens includes at least one aspherical surface, where the aspherical surface satisfies the following mathematical formula:

$$Z = \frac{CY^2}{1+\sqrt{1-(K+1)C^2Y^2}} + A_4Y^4 + A_6Y^6 + A_8Y^8 + A_{10}Y^{10} + A_{12}Y^{12},$$

and Z is the coordinate values in the direction of the optical axis OA. The light transmission direction is in the positive direction. A4, A6, A8, A10, and A12 are aspherical coefficients; K is the quadratic surface constant; C=1/R, R is the curvature radius; and Y is the coordinate values orthogonal to the optical axis direction, wherein its upper side is the positive direction. In addition, every parameters and coefficients value of above-mentioned aspheric mathematical formula of each aspherical lens can be respectively set to determine the focal length of each aspheric lens.

In one embodiment, the first lens L1 and the second lens L2 both can be aspheric lenses, or both are free formed lens surfaces with free-form surfaces, or one is an aspherical lens and the other is a free formed lens. Preferably, the first lens L1 and the second lens L2 are both aspherical lenses made of plastic. Furthermore, the first lens L1 may be a lenticular lens and the second lens L2 may be a biconcave lens.

Detailed information of an electronic viewfinder according to one embodiment is shown in Table 1, which contains curvature radius of each lens, thickness, refractive index, Abbe number, and the focal length. Surface codes of the lens are arranged from the observing side to the image side. For example, "S1" represents the aperture stop AS; "S2" represents the surface of the first planar lens C1 toward the observing side; "S3" represents the surface of the first planar lens C1 toward the image side; "S4" represents the surface of the first lens L1 toward the observing side, etc. Furthermore, the surface "OBJ" is a virtual surface, where the thickness of OBJ is defined as the distance measured from the virtual surface OBJ to the aperture stop AS (the aperture stop may be the observer's pupil). If the thickness is negative, the OBJ surface is in front of the pupil; if the thickness is positive, the OBJ surface is behind the pupil. The OBJ surface can be regarded as a position of a clear image at a predetermined diopter.

In one embodiment, the focal length EFL of the lens group G is 16.673 mm. The diameter of the aperture stop AS is 4.5 mm. Total track length TTL is 18.575 mm. The ratio conditions are TTL/EFL=1.114 and 250/EFL=15. Module length ML is 20.873 mm. Shapes of the first lens L1 and the second lens L2 may be rectangular in form, and in the present embodiment, it is preferably a rectangle.

TABLE 1

| Element code | Surface code | Curvature Radius (mm) | Thickness (mm), +1D | Thickness (mm), 0D | Thickness (mm), −3D | Refractive index | Abbe number |
|---|---|---|---|---|---|---|---|
|  | OBJ | Infinity | 1000 | Infinity | −333 |  |  |
| AS | S1 | Infinity | 18 | 18 | 18 |  |  |
| C1 | S2 | Infinity | 0.8 | 0.8 | 0.8 | 1.517 | 64.17 |
|  | S3 | Infinity | 1.218 | 1.498 | 2.346 |  |  |
| L1 | S4 | 7.8644 | 6.11 | 6.11 | 6.11 | 1.544 | 56.11 |
|  | S5 | −6.8699 | 0.4 | 0.4 | 0.4 |  |  |
| L2 | S6 | −7.3606 | 2.19 | 2.19 | 2.19 | 1.584 | 30.88 |
|  | S7 | 25.0552 | 4.565 | 4.285 | 3.437 |  |  |
| P | S8 | Infinity | 0.2 | 0.2 | 0.2 | 1.492 | 57.44 |
|  | S9 | Infinity | 4.759 | 4.759 | 4.759 |  |  |
| C2 | S10 | Infinity | 0.63 | 0.63 | 0.63 | 1.517 | 64.17 |
|  | S11 | Infinity | 0.001 | 0.001 | 0.001 |  |  |
| I | S12 | Infinity | — | — | — | — | — |

Furthermore, "thickness" represents the distance measured between a surface and the other surface adjacent to the image side. For example, the "thickness" of the surface S1 is the distance measured between the surface S1 and the surface S2, and the "thickness" of the surface S2 is the distance measured between the surface S2 and the surface S3. As shown in Table I, as the diopter changes, the thickness measured between the surface S3 and surface S7 also varies.

In addition, in Table 1, the surface Codes "S4", "S5", "S6", and "S7" are aspherical surfaces. The coefficients of aspheric mathematical formula are shown in Table II.

TABLE 2

|  | K | A4 | A6 | A8 | A10 | A12 |
|---|---|---|---|---|---|---|
| S4 | −0.38833 | −4.124129E−005 | −2.816116E−006 | −1.510549E−006 | 7.941671E−008 | −1.131771E−009 |
| S5 | 0.02891 | 1.000478E−003 | 1.565036E−006 | −7.060045E−007 | 6.593934E−008 | −1.168857E−009 |
| S6 | −1.97526 | 4.017877E−005 | 2.328185E−004 | −1.888923E−005 | 6.493937E−007 | −8.059783E−009 |
| S7 | 37.57730 | 2.199431E−004 | 2.234123E−004 | −6.830279E−006 | −9.006329E−007 | 3.621756E−008 |

Figure 2A:
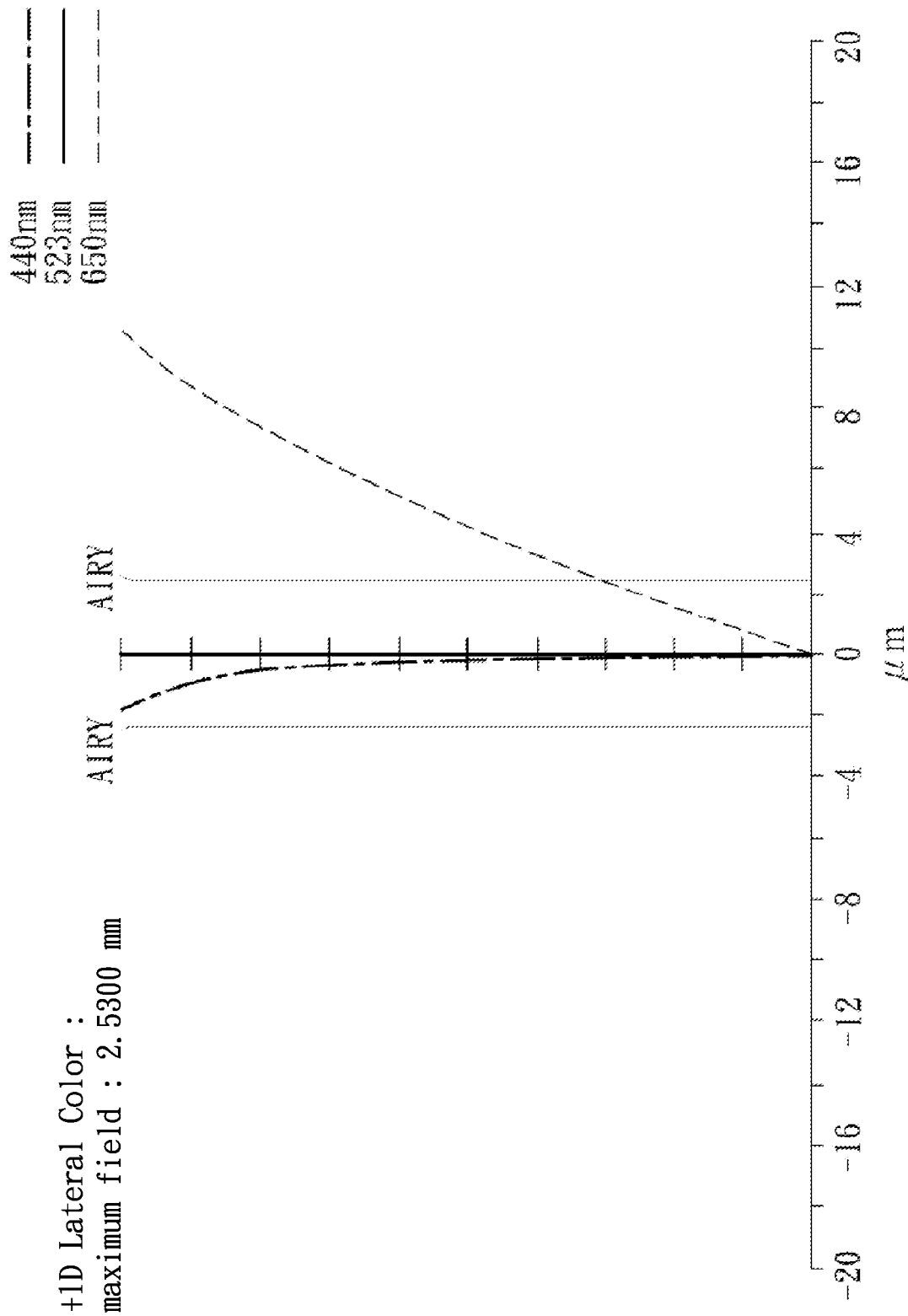
FIGS. 2A and 2B respectively show characteristic curve of lateral chromatic aberration according to one of the embodiments.
Figure 2B:
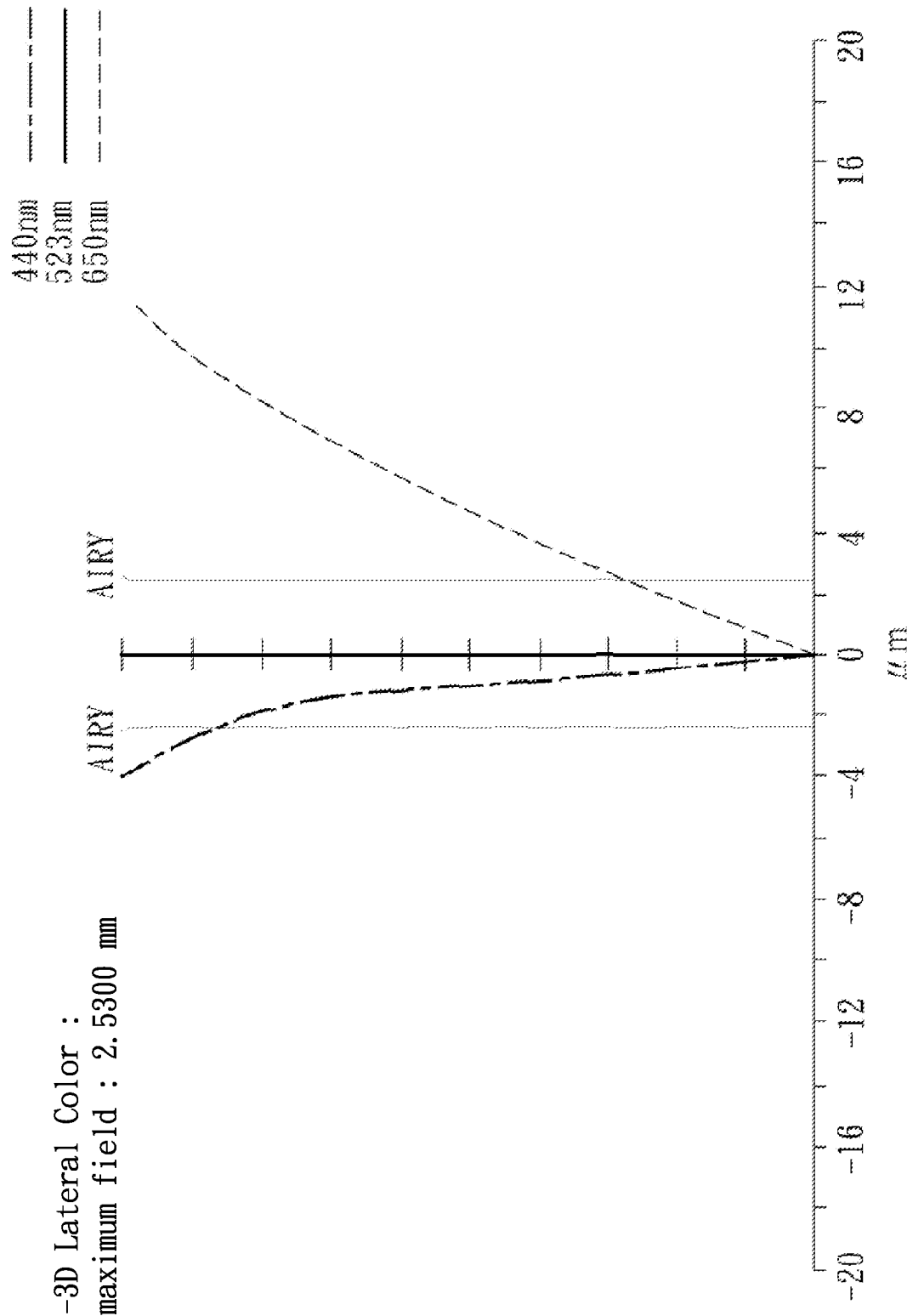

FIGS. 2A and 2B respectively show characteristic curves of lateral chromatic aberration resulted from the electronic viewfinder 10 when the diopter is at +1D and −3D according to one of the embodiments. At diopter +1D, the chromatic aberration of wavelength 440 nm, 523 nm, and 650 nm are controlled within the range between −2 μm and 11 μm. At diopter −3D, the chromatic aberration of wavelength 440 nm, 523 nm, and 650 nm are controlled within the range between −4 μm and 12 μm.

Figure 3A:
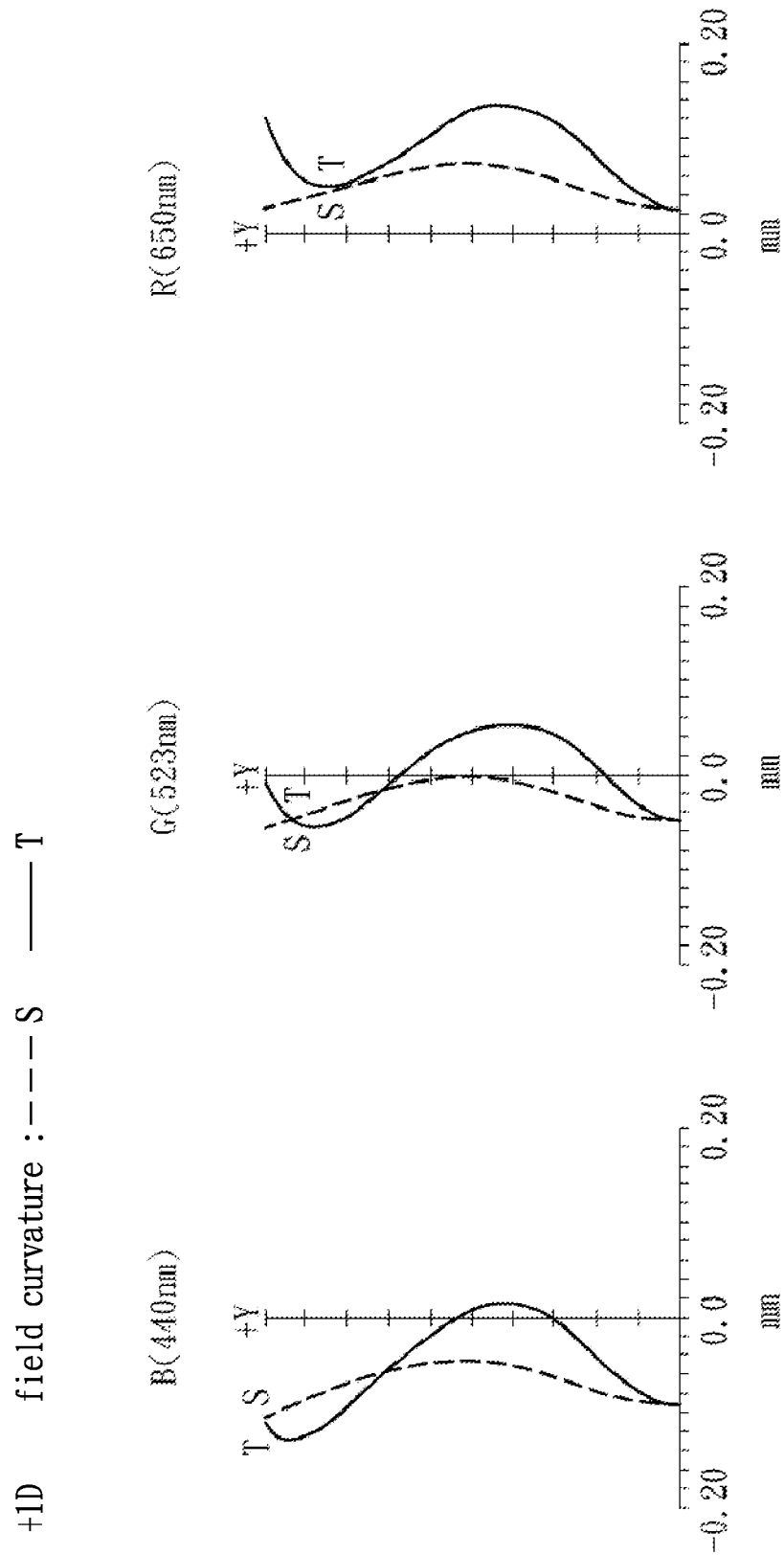
FIGS. 3A and 3B respectively show the characteristic curve of field curvature according to one of the embodiments.
Figure 3B:
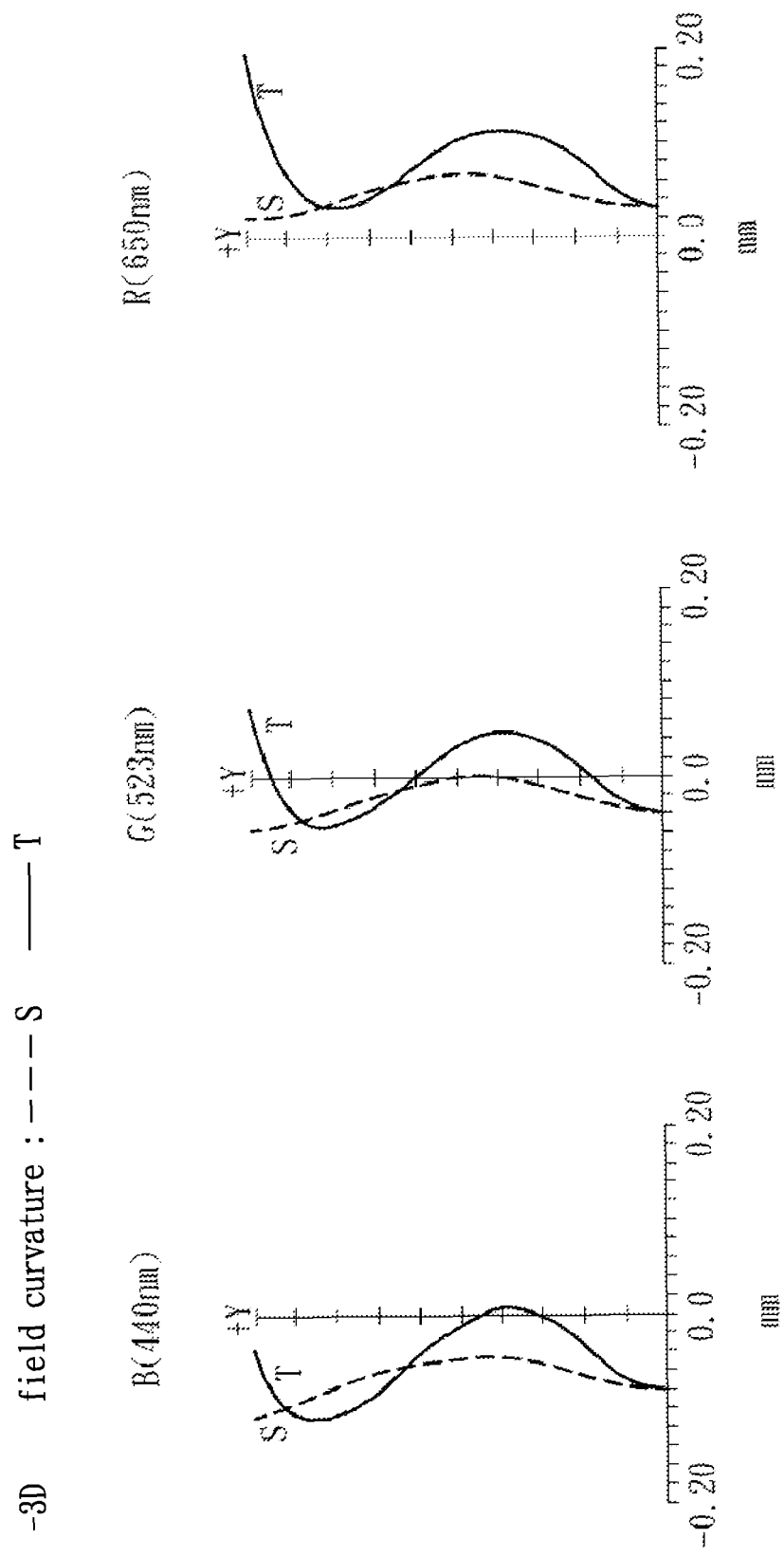

FIGS. 3A and 3B respectively show the characteristic curves of field curvature results from the electronic viewfinder 10 when the diopter is at +1D and −3D according to one of the embodiments. In the figures, Curve T is the tangential rays of field curvature; Curve S is the sagittal rays of field curvature. At diopter +1D, the tangent field curvature and the sagittal field curvature of wavelength 440 nm, 523 nm, and 650 nm are controlled within the range between −0.13 mm and 0.14 mm. At diopter −3D, the tangent field curvature and the sagittal field curvature of wavelength 440 nm, 523 nm, and 650 nm is controlled within the range between −0.11 mm and 0.20 mm.

Figure 4A:
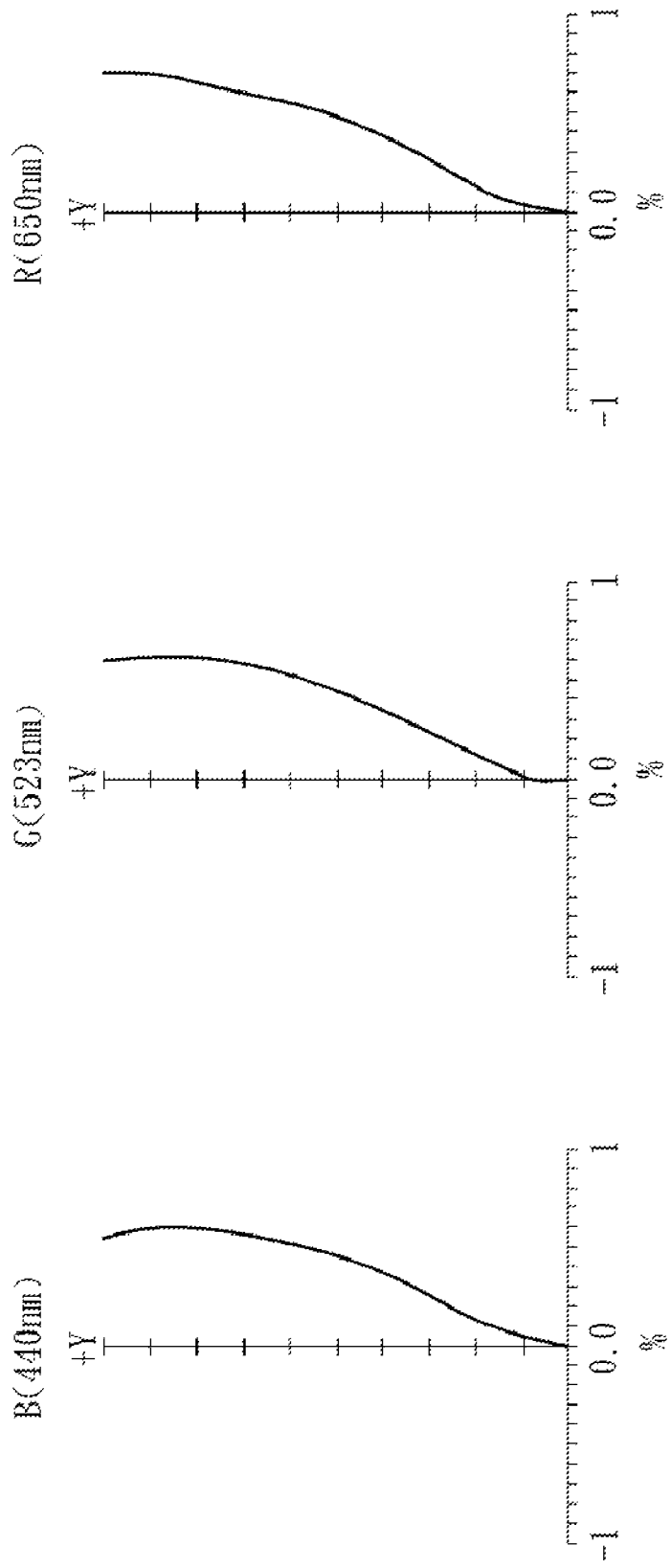
FIGS. 4A and 4B respectively show the curve of distortion according to one of the embodiment.
Figure 4B:
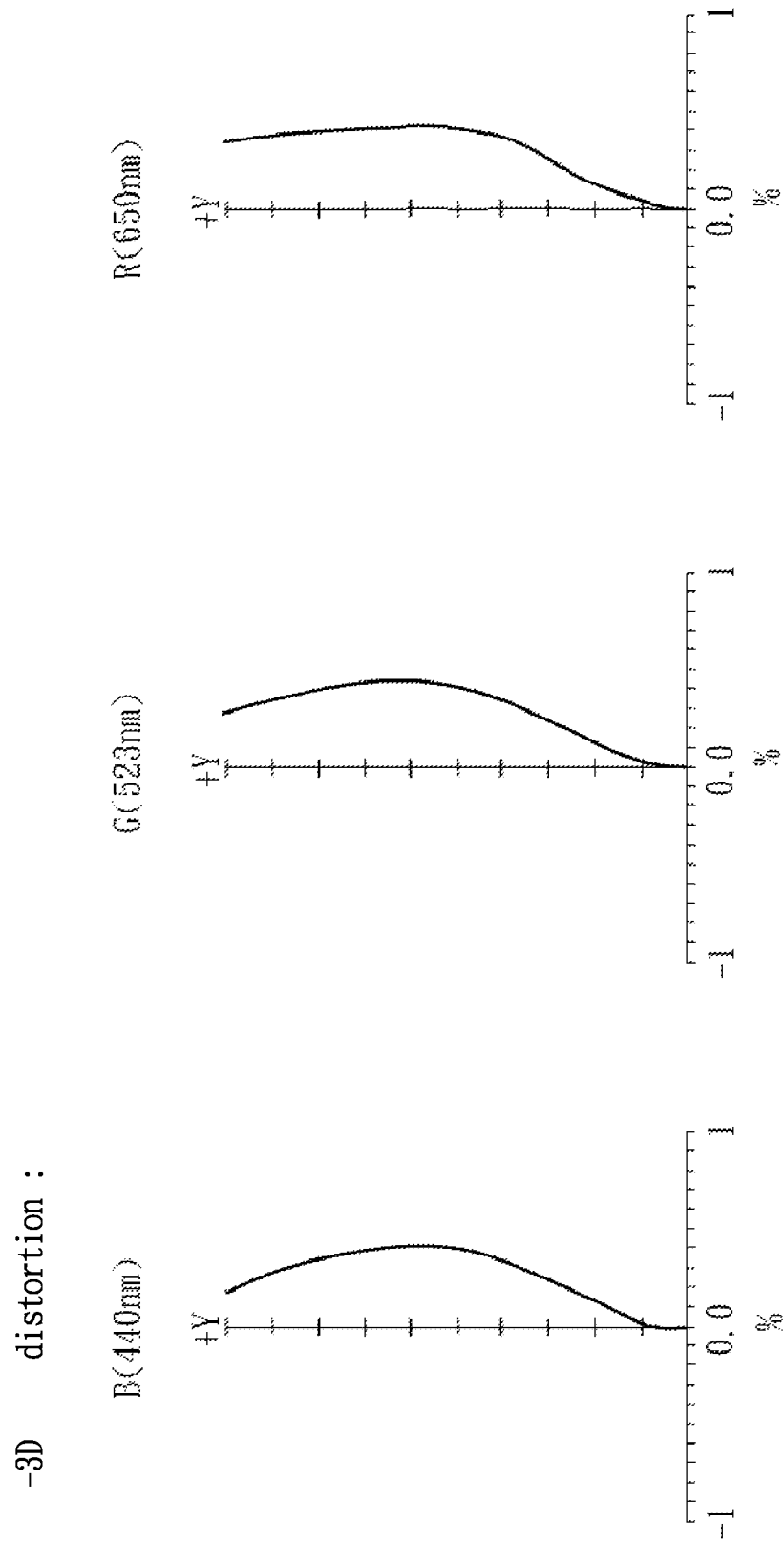

FIGS. 4A and 4B respectively show the curves of distortion resulted from the electronic viewfinder 10 when the diopter is at +1D and −3D according to one of the embodiments. At diopter +1D, the distortion of wavelength 440 nm, 523 nm, and 650 nm is controlled within the ranges of 0.0% to 0.7%. At diopter −3D, the distortion of wavelength 440 nm, 523 nm, and 650 nm is controlled within the ranges of 0.0% to 0.4%. As described above, the characteristic diagram of the lateral chromatic aberration, field curvature, and distortion can prove that observers can see clear images through the electronic viewfinder in one embodiment of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electronic viewfinder having a first planar lens and a display positioned between an observing side and an image side, and the electronic viewfinder comprises:
a lens group with positive power from the observing side to the image side comprising at least a first lens with positive power and a second lens with negative power; and
a polarizer, wherein the polarizer is disposed between the display and the lens group;
wherein the electronic viewfinder follows the condition of 250/EFL≥15, wherein EFL is a focal length of the lens group.

2. The electronic viewfinder of claim 1, wherein the lens group is disposed between an aperture stop and the display, and the first planar lens is disposed between the aperture stop and the lens group.

3. The electronic viewfinder of claim 2, wherein a distance from the aperture stop to a surface of the first planar lens proximal to the observing side is greater than or equal to 15 mm, and a diameter of the aperture stop is greater than or equal to 4 mm.

4. The electronic viewfinder of claim 1, wherein the electronic viewfinder follows the condition of TTL/EFL≤1.5, wherein TTL is a distance from a surface of the first lens proximal to the observing side to the display when the electronic viewfinder performs 0 diopter (0D), and EFL is a focal length of the lens group.

5. The electronic viewfinder of claim 1, wherein the electronic viewfinder follows the conditions of nd1<1.56 and vd1>50, wherein nd1 is a refractive index of the first lens and vd1 is an Abbe number of the first lens.

6. The electronic viewfinder of claim 1, wherein the electronic viewfinder follows the conditions of nd2>1.56 and vd2<50, wherein nd2 is a refractive index of the second lens and vd2 is an Abbe number of the second lens.

7. The electronic viewfinder of claim 1, wherein at least one lens of the lens group is an aspherical lens or a free formed lens.

8. The electronic viewfinder of claim 1, wherein at least one lens of the lens group is a plastic lens.

9. The electronic viewfinder of claim 1, further comprising a second planar lens, wherein the second planar lens is disposed between the lens group and the display, and the polarizer is disposed between the second planar lens and the lens group.

10. The electronic viewfinder of claim 1, wherein a distance from a surface of the first planar lens proximal to the observing side to the display is a module length ML, the module length ML is less than 21 mm, and a diopter of the electronic viewfinder is between −5D and +5D.

11. An electronic device comprising the electronic viewfinder as described in claim 1.

12. An electronic viewfinder comprising: a lens group with positive power, and the lens group comprises at least a first lens and a second lens positioned between an observing side and an image side, wherein at least one of the first lens and the second lens is an aspherical plastic lens and/or a free formed plastic lens; and a polarizer, wherein the polarizer is disposed between the image side and the lens group; wherein the electronic viewfinder follows the condition of 250/EFL>=15, wherein EFL is a focal length of the lens group.

13. An electronic viewfinder with a display disposed in a predetermined space, the electronic viewfinder comprises:
a first planar lens proximal to an observing side;
a lens group with adjustable diopter positioned opposite to the first planar lens and the observing side, wherein the lens group is allowed to generate relative displacement with respect to the first planar lens, and the lens group is allowed to enlarge an image on the display; and
a polarizer, wherein the polarizer is disposed between the display and the lens group;
wherein the electronic viewfinder follows the conditions of 250/EFL≥15, wherein EFL is a focal length of the lens group.

14. The electronic viewfinder of claim 13, wherein the lens group comprises a first lens with positive power and a second lens with negative power, and the lens group is disposed between the first planar lens and the display.

15. The electronic viewfinder of claim 14, wherein the electronic viewfinder follows the conditions of nd1<1.56 and vd1>50, wherein nd1 is a refractive index of the first lens and vd1 is an Abbe number of the first lens.

16. The electronic viewfinder of claim 14, wherein the electronic viewfinder follows the conditions of nd2>1.56 and vd2<50, wherein nd2 is a refractive index of the second lens and vd2 is an Abbe number of the second lens.

17. The electronic viewfinder of claim 14, wherein the electronic viewfinder follows the conditions of TTL/

EFL≤1.5, wherein TTL is a distance from a surface of the first lens proximal to the observing side to the display when the electronic viewfinder performs 0 diopter (0D).

18. The electronic viewfinder of claim 13, wherein a ratio of a module length ML of the electronic viewfinder and the adjustable diopter is less than or equal to 6.25 mm/D.

19. The electronic viewfinder of claim 13, further comprising a module length ML, wherein a ratio of the module length ML and an eye relief is less than 1.7.

* * * * *